United States Patent [19]

Schneider et al.

[11] 4,301,850

[45] Nov. 24, 1981

[54] PROCESS FOR THE MANUFACTURE OF TIRES BY MOLDING AND TIRES OBTAINED BY THIS PROCESS

[75] Inventors: André Schneider, St.-Hyppolyte; Jean-Pierre Cesar, Sayat; Jacques Gouttebessis, La Mouteyre, all of France

[73] Assignee: Compagnie Generale des Etablissements Michelin, Clermont-Ferrand, France

[21] Appl. No.: 163,336

[22] Filed: Jun. 26, 1980

[30] Foreign Application Priority Data

Jun. 29, 1979 [FR] France ............................. 79 17413

[51] Int. Cl.³ .................... B60C 9/18; B29H 17/04
[52] U.S. Cl. ..................... 152/361 R; 152/361 FP; 152/357 R; 152/359; 156/123 R; 156/124; 156/125; 264/262; 264/267; 264/273; 264/275; 264/326; 264/271.1
[58] Field of Search ........ 156/110 R, 110 CL, 110 C, 156/123 R, 124, 125, 126, 128, 133; 152/357 R, 357 A, 358, 359, 361, 361 DM, 361 FP; 264/501, 251, 255, 262, 267, 271, 273, 275, 279, 326

[56] References Cited

U.S. PATENT DOCUMENTS

| 2,757,701 | 8/1956 | Henson | 156/123 X |
| 3,374,131 | 3/1968 | Gough | 156/126 |
| 3,578,057 | 5/1971 | Knipp | 152/356 |
| 3,692,080 | 9/1972 | Boileau | 152/359 |
| 3,775,528 | 11/1973 | Beneze | 152/357 A |
| 3,833,043 | 9/1974 | Watanabe et al. | 152/357 A |
| 4,055,619 | 10/1977 | Goodfellow | 264/258 |
| 4,088,523 | 5/1978 | Gallizia et al. | 156/125 |

Primary Examiner—John E. Kittle
Attorney, Agent, or Firm—Brumbaugh, Graves, Donohue & Raymond

[57] ABSTRACT

A process of manufacturing tires having a crown reinforcement from one or more liquid or pasty materials which solidify in a core mold is improved due to the fact that prior to the filling of the mold there is placed in the mold an elastically deformable annular net formed of two superimposed plies of parallel wires crossed from one ply to the other at an angle at most equal to 90° with respect to the circumferential direction of the tire, at least the outside of the wires being formed of an elastic and weldable material permitting welding of the wires of one ply to those of the other ply at the points where they intersect, the net being placed in the mold with its edges equidistant from the equatorial plane of the tire.

21 Claims, 7 Drawing Figures

PROCESS FOR THE MANUFACTURE OF TIRES BY MOLDING AND TIRES OBTAINED BY THIS PROCESS

This invention relates to tires which are manufactured from one or more liquid or pasty materials which solidify in a mold, forming the elastomeric mass of the tire and are provided with a reinforcement at least in the region of the tread. These tires are essentially formed of a crown and of two sidewalls terminated by beads.

The mold usually contains a flexible or rigid core intended to impart its shape to the inner wall of the tire. Prior to filling the mold with the liquid or pasty materials, it is necessary to place the reinforcement of the tire within the mold and then maintain the position of the reinforcement during the filling of the mold and the solidification of the liquid or pasty materials. The maintaining in position of the reinforcement is particularly difficult when it consists essentially of a crown reinforcement, limited, for instance, to the region of the tread. A deviation from the desired position of the crown reinforcement results in an alteration in the properties of the tire, which alteration may make the tire unusable.

In order to hold the reinforcement in place it has been proposed to use elements which are integral with the mold. Removal from the mold is difficult and if the imprints of the holding elements for the reinforcement are not hermetically plugged they permit penetration to the reinforcement of materials which may damage it, whatever the base material or materials forming the elements which constitute it.

It has also been proposed to form a reinforcement by winding wires sheathed with a material identical to the elastomeric mass of the tire around the core of the mold, the core itself being provided with grooves to avoid the sliding of the wires, which form a continuous reinforcement of the bias type. The sheathings of the wires space the reinforcement wires from the inner wall of the tire. Such a process is laborious; it makes it necessary to build up the reinforcement wire by wire and does not make it possible to produce a crown reinforcement similar to those which are successfully used in tires of the radial carcass type.

The object of the invention is to suitably maintain the crown reinforcement in position in the mold, particularly during the filling of the mold, and especially with respect to the space between the core of the mold or the inner wall of the tire and the reinforcement, without having recourse either to holding means which are integral with the mold or its core nor to an anchoring of the reinforcement to the bead rings.

The basic principle of the invention resides in the use of annular nets which are continuous in circumferential direction, formed of two superimposed plies of wires parallel in each ply and crossed from one ply to the other. These nets are elastically deformable, because their wires are produced, for instance by extrusion, at least with respect to the outside of the wires, of an elastic material which is weldable, that is to say which makes it possible to weld (e.g., by conventional heat softening and cooling treatment) the wires of one ply to those of the other ply at the points where they intersect without the material forming the points of weld of one ply to the other losing its elasticity. For this reason, when such a net is expanded elastically, its circumferential development increases while the angle of the wires of one ply relative to those of the other ply as well as the axial width of the net decrease. Conversely, when such a net is elastically contracted, its circumferential development is decreased while the angle between the two plies as well as the axial width of the net increase. In both cases, when the force of expansion or contraction is eliminated, the net, due to the elasticity of the points of weld between the two plies, returns to its nondeformed state.

According to the invention, one utilizes in accordance with two fundamental methods the elastic deformation of such nets, the two plies of which may be of wires formed entirely of an elastic and weldable material or at least one ply of which may be of wires in the form of a reinforcement cable sheathed in an elastic and weldable material.

A first method consists in covering the core of the mold by the elastically expanded net in such a manner that the annular net closely surrounds the core. The second method consists in arranging the elastically contracted net against the crown of the mold when one contemplates subsequently molding a tread over the supporting assembly thus produced, or to provide said assembly with a removable tread. A variant of this second method consists in placing the annular tread in the crown of the mold and then placing a net in elastically contracted condition against the radially inner face of said tread.

In accordance with both methods, the mold is then filled with the liquid or pasty material or materials which form the elastomer of the tire.

The elastic and weldable material of the two-ply nets is preferably identical for each ply and identical to the elastomer forming the tire.

The term "cable" (possibly reinforcing one or both plies of the nets) refers collectively to any continuous filiform element capable of reinforcing tire reinforcement plies, particularly textile or fiberglass cables, or metal cables, for instance steel wires or fibers.

When, in case of the use of the first method (expanded net) it is desired to reduce the number of lines of contact of the net with the core of the mold, there are used, for the radially inner ply of the net, wires at least some of which have a cross section of the radial dimension of which is greater than those of the other wires of the ply; the other wires will therefore not touch the core.

Used in accordance with the first method (expanded net), a net in accordance with the invention, whether or not the plies are reinforced, constitutes an element which spaces the crown reinforcement from the core of the mold. For this purpose the sheathing of elastic and weldable material of the wires of the radially inner ply of the net can be used. One can also use the wires consisting entirely of elastic and weldable material which form the radially inner ply of the net. Finally, one can use a net both of the plies of which are of wires formed entirely of an elastic and weldable material and then cover this net with an annular crown reinforcement formed, for instance, of another elastic net each ply of which is formed of reinforcement cables sheathed in an elastic and weldable material.

The two methods make it possible advantageously to form the crown reinforcement by means of two crossed plies whose width decreases for instance radially towards the outside. For this purpose it is sufficient to use two nets of different width each having a ply of cables sheathed in an elastic and weldable material. The two nets are placed one within the other in such a manner that, for instance, the two plies of cables are in contact with each other. Thereupon the assembly thus produced is contracted or expanded in order to put it in place in the mold.

It is also possible to build and use according to both methods a crown reinforcement having two plies one of which plies comprises edges folded back around the edges of the other ply, by using two nets of different width, each having, as above, a ply of sheathed cables, for instance, adjacent the ply of the other net. The folding back of the edges of the wider net around the edges of the narrower net axially can be effected by the customary means.

In general, the process of the invention is characterized by the fact that prior to the filing of the mold there is placed in the mold at least one annular net of suitable width, continuous in the circumferential direction of the tire and elastically deformable so that in deformed state its developed length is equal to the developed length of the crown reinforcement, this net being formed of two superimposed plies of wires parallel in each ply and crossed from one ply to the other at an angle at most equal to 90° with respect to the circumferential direction of the tire, at least the outside of the wires being formed of an elastic and weldable material permitting welding of the wires of one ply to those of the other ply at the points where they intersect, the net being placed in the mold with its edges equidistant from the equatorial plane of the tire.

Within the scope of the first method, the invention extends essentially to the following embodiments.

In case of the use of a spacer net placed on the core of the mold in cooperation with an annular crown reinforcement, the process of the invention is characterized by the fact that there is used a net in which the wires of each ply are formed entirely of elastic and weldable material, preferably identical to the material of the elastomeric mass of the tire; by the fact that the net is placed in contact with the core of the mold, the net having in nondeformed state a developed length less than and in deformed state a developed length at least equal to the outer equatorial development of the core; and by the fact that an annular reinforcement is placed around the net.

A variant of this case is characterized by the fact that as the annular reinforcement there is used a second net, the wires of the two plies of this net being in the form of cables sheathed in the elastic and weldable material, which is preferably identical to the material forming the wires of the first net, this second net having in nondeformed state a developed length less than and in deformed state a developed length at least equal to the outer equatorial development of the first net in place on the core.

The process of the invention makes it possible to use a single reinforcement ply. Thus the process is characterized by the fact that there is used a net placed in contact with the core of the mold and having in nondeformed state a developed length less than and in deformed state a developed length at least equal to the outer equatorial development of the core, the wires of the ply of the net placed on the core being formed entirely of an elastic and weldable material and the wires of the other ply being in the form of cables sheathed in an elastic and weldable material which is preferably identical to the material constituting the wires of the first ply.

However, one can also use such a single net of suitable width comprising a ply of sheathed cables folded on itself prior to the placement in the mold in such a manner that the folded edges are contiguous or not or overlap.

Two nets each comprising only one ply of sheathed cables but of different width may be used to form a two-ply crown reinforcement. Accordingly, the corresponding process is characterized by the fact that over the first net there is placed a second net having in nondeformed state a developed length less than and in deformed state a developed length at least equal to the outer equatorial development of the first net in place on the core, the ply of wires of the second net in contact with the first net being in the form of cables sheathed in an elastic and weldable material, the other ply of the second net being formed of wires which are formed entirely of an elastic and weldable material which is preferably identical to the material covering the cables of the first ply, one of these two nets, preferably the radially outer net, having an axial width less than that of the other net and the ply of sheathed cables of the second net crossing the ply of sheathed cables of the first net to form an acute angle of a sign opposite that which the ply of sheathed cables of the first net form with the circumferential direction of the tire.

This variant is also suitable to form a two-ply crown reinforcement, the edges of the wider net (prior to placement in the mold) being folded around the edges of the axially narrower net in such a manner that the edges of the wider net are contiguous or not or overlap.

Within the scope of the second method (contracted net), the invention extends essentially to the following embodiments.

In order to form a two-ply crown reinforcement, the process in accordance with the invention is characterized by the fact that there is used a net, the two plies of which are constituted of wires in the form of cables sheathed with an elastic and weldable material which is preferably identical to the material of the elastomeric mass of the tire; and by the fact that the net is placed in contact either with the inner wall of the tread which has been previously placed in the mold or with the inner wall of the crown of the mold, the net having in nondeformed state a developed length greater than and in deformed state a developed length equal to the developed length of the inner wall of the tread or of the inner wall of the crown in the mold.

In order to form a crown reinforcement of two plies of different width, the process in accordance with the invention is characterized by the face that there is used two concentric nets in contact with each other, the radially outer net being placed in contact either with the radially inner face of the tread which has been previously placed in the mold or with the inner wall of the crown of the mold, the radially outer ply of the net located radially to the outside and the radially inner ply of the net located radially to the inside being formed of wires formed entirely of an elastic and weldable material, the other two plies each belonging to one of the nets in contact with each other being formed of cables sheathed with an elastic and weldable material and crossed from one ply to the other forming acute angles of opposite signs with the circumferential direction of the tire, one of the nets, preferably the net placed radially to the outside, having a smaller axial width than the other net, the two nets having in nondeformed state a developed length greater than and in deformed state a developed length equal to the developed length of the radially inner face of the tread or of the inner wall of the crown of the mold.

However, the use of the second method extends also to cases in which the crown reinforcement has folded edges. A first variant is characterized by the fact that there is used a net one ply of which is formed of wires formed entirely of an elastic and weldable material and the other ply of which is formed of cables sheathed in an elastic and weldable material which is preferably identical to the material constituting the wires of the first ply; and by the fact that prior to placement in the mold the edges of the net are folded on themselves so that the edges are contiguous or not or overlap, the net having in nondeformed state a developed length greater than and in the deformed state a developed length equal to the developed length of the radially inner face of the tread or of the inner wall of the crown of the mold.

Another variant is characterized by the fact that prior to placement in the mold the edges of the wider net are folded around the edges of the axially narrower net so that the edges of the wider net are contiguous or not or overlap.

The drawing and the portion of the specification which relates thereto illustrate various embodiments of the invention. In the drawing, all the figures except FIG. 1 are schematic views in meridian cross section; more precisely:

Figure 1:
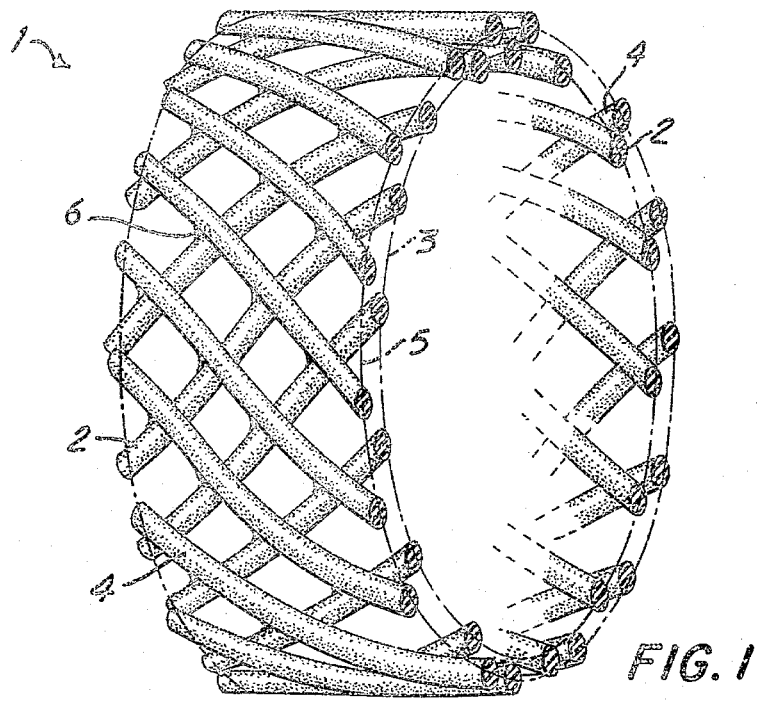
FIG. 1 shows in perspective an elastic net in its initial state after its manufacture and before expansion or contraction.

In the drawing, the distance between the wires and their diameter has been exaggerated for clarity in the showing. In the meridian cross sections, the wires formed entirely of elastic and weldable material are indicated by a closed contour and the wires in the form of a cable sheathed with an elastic and weldable material are indicated by a closed contour surrounding a core indicated by a black circle representing the cable, the closed contour representing the outer surface of the sheathing.

FIG. 1 shows a net 1 of suitable width, shown in its initial cylindrical (nondeformed) state. The wires 2 of the ply 3 are welded to the wires 4 of the ply 5 of the net 1 at the places where they intersect the wires of the ply 5, thus forming elastic nodes 6 which permit the elastic deformation of the net 1.

Figure 2:
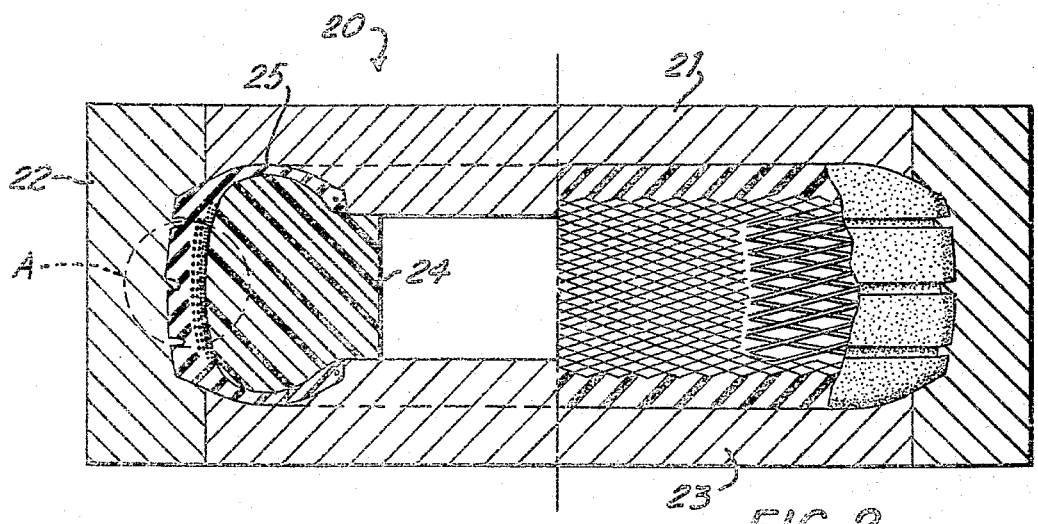
FIG. 2 shows a mold in which there is contained a tire molded on a core around which a spacer net and a crown reinforcement are arranged.
Figure 2A:
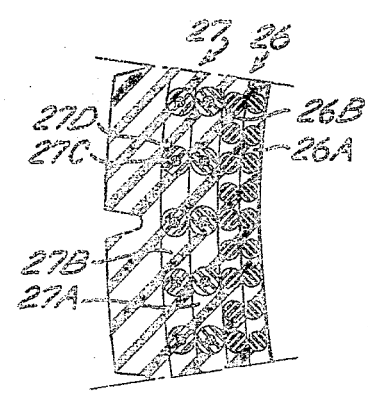
FIG. 2A is a view on a larger scale of the portion of the tire contained within the circle A in FIG. 2.

In FIGS. 2 and 2A there is shown a mold 20 comprising essentially three shells 21, 22, 23 and a core 24. The two shells 21 and 23 form the sidewalls, the shell 22 the crown, and with the two side shells, the inner wall of this mold. The tire 25 has a meridian cross section which is defined by the walls of the shells 21, 22, 23 and of the core 24. An elastic net 26, formed of two plies 26A and 26B of wires of an elastic and weldable material is placed, after expansion, on the core 24. A crown reinforcement is placed on the spacer net 26. It is formed, for instance, of an elastic net 27 (expanded) composed of two plies 27A and 27B of wires in the form of cables 27C surrounded by a sheathing 27D of an elastic and weldable material.

Figure 3:
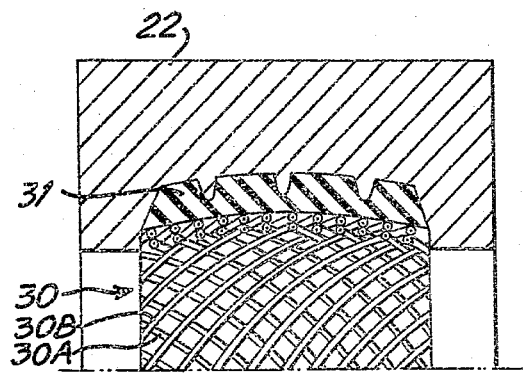
FIG. 3 is a view of an elastic net forming a two-ply reinforcement and contracted so as to remain applied, during the molding of the tire, against the inner face of a tread contained in the crown of a mold.

FIG. 3 shows a contracted elastic net 30 placed against the inner face of an annular tread 31 which has been previously placed against the crown 22 of the mold. This net 30, similar to the net 27 shown in FIGS. 2 and 2A, is formed, like the latter, of two plies 30A and 30B each of wires in the form of cables surrounded by a sheathing of an elastic and weldable material.

Figure 4:
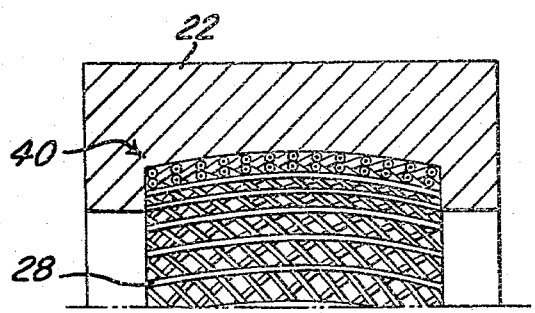
FIG. 4 is a view similar to FIG. 3, but in this case the elastic net is contracted so as to remain applied, during the molding of the tire, against the inner wall of the crown of a mold.

As a variant (See FIG. 4), a net which could be the same as the one of FIG. 3 but which in this example is supplemented by an additional ply 28, the purpose of which will be described further below, is placed directly against the inner wall of the shell 22.

Figure 5:
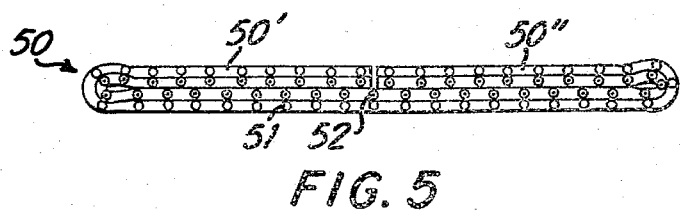
FIG. 5 is a view of a crown reinforcement formed by folding a net on itself.

The net 50 illustrated in FIG. 5 is formed by a ply of wires 51 formed entirely of an elastic and weldable material, and by a ply of cables 52 each surrounded by a sheath of an elastic and weldable material. The edges 50', 50" of the net 50 are folded back on the net and, in the example shown, practically touch each other. If the net 50, folded in this manner, is placed on a mold core, it is seen that the ply of nonreinforced wires 51 is radially to the inside of the ply of reinforced wires 52 and that the nonreinforced ply constitutes a device for the spacing of the crown reinforcement with respect to the outer wall of the core, that is to say with respect to the inner wall of the tire or possibly with respect to the carcass reinforcement (now shown) of the tire.

Figure 6:
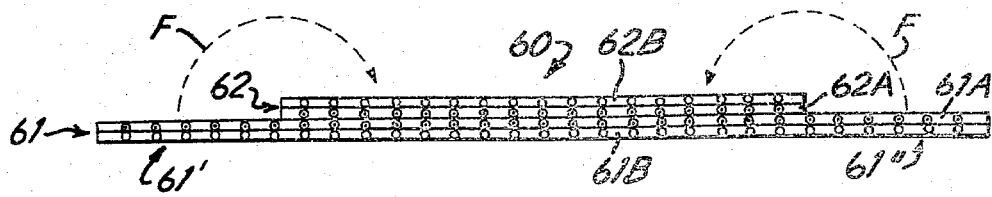
FIG. 6 is a view of a crown reinforcement formed by two nets of different width, which can be folded as indicated by the arrows F by turning the edges of the wider net around the narrower net.

In FIG. 6 there is shown an assembly 60 formed of two nets 61 and 62 of different width, the net 61 being wider than the net 62. Each of these nets has a reinforced ply 61A and 62A, respectively, and a nonreinforced ply 61B and 62B, respectively. The nets are arranged one on the other in such a manner that the reinforced plies 61A and 62A touch each other. In this way, one can produce a crown reinforcement with crossed plies 61A, 62A of decreasing width. Such an assembly 60 can be manufactured so that it can be expanded to place it around a mold core or can be manufactured so that it can be contracted to be applied against a mold crown or the inner face of a tread. The nonreinforced wire ply 61B which is radially on the inside and in contact with the core of the mold forms a spacing device for the reinforced plies 61A, 62A with respect to the wall of the tire.

As indicated by the arrows F, the edges 61' and 61" of the net 61 can be folded back on the edges of the narrower net 62. There is thus obtained a crown reinforcement having a folded ply.

It is obvious that the nets in accordance with the invention can be folded and arranged in various manners, as are certain crown reinforcements of known tires, traditionally composed of plies of cables of fabric and not of nets. The invention therefore extends to the use of folded or unfolded nets.

One main variant of the first method consists in using the net of the invention in a mold intended to turn around its axis of revolution (centrifugal molding).

Under the effect of the centrifugal force produced by the rotation of the mold, the elastic net expands circumferentially so that in elastically deformed state its developed length is equal to the developed length of the crown reinforcement. Thus the deformed net can apply itself either against the crown of the mold when it is contemplated to superimpose subsequently, for instance by over-molding, a tread on the supporting assembly which has thus been produced, or against the radially inner face of an annular tread which has been previously arranged in the crown of the mold.

In this variant at least one net having in nondeformed state a developed length less than that of the crown reinforcement or even less than the equatorial development of the core is used. This has the advantage of permitting the use of a net, the geometrical characteristics of which in deformed state are very close to those in deformed state under the effect of the centrifugal force.

In order to produce a two-ply crown reinforcement there is used a net, the two plies of which consist of cables sheathed in an elastic and weldable material. In order to produce a crown reinforcement with folded edges, one of the plies of the net consists of cables sheathed in an elastic and weldable material and prior to the placement of the net in the mold the edges of the net are folded on themselves so that the edges are contiguous or not or overlap. In order to produce a crown reinforcement with two plies with stepped edges there are used two nets of different axial width each having a ply of cables sheathed in an elastic and weldable material and the wider net is arranged radially on the inside of the other net. For a reinforcement with a ply folded around a nonfolded ply, the edges of the wider net are folded, before placement in the mold, around the edges of the axially narrower net in such a manner that the edges of the first net are contiguous or not or overlap.

Among the elastic and weldable materials which can be used for the present invention mention may be made of the thermoplastic polyolefins (such as high-density polyethylene, polypropylene, polymethylpentenes and copolymers of these products), acrylonitrile-butadiene-styrene (ABS), the thermoplastic elastomers (thermoplastic polyurethanes, polyether-esters), the polyamides, the polyesters and unvulcanized rubber mixes.

The elasticity of the net described above makes it possible to position it suitably with respect to the mold. However, the requirements of manufacture make it necessary that the liquid or pasty material or materials intended to form the elastomeric mass of the tire fill the mold as rapidly as possible. Under these circumstances, the net must be able to withstand the forces exerted on it by the liquid or pasty material or materials which penetrate at high speed into the mold and tend to deform and displace it.

In order to avoid this drawback, the invention provides for imparting a limited oriented elasticity to the net. For this purpose, the net 40 comprises at least one additional ply 28 (See FIG. 4) formed of parallel wires formed entirely of elastic material which is weldable to one of the two plies of the net, these wires forming with the circumferential direction of the tire a larger angle in absolute value than each of the angles formed by the wires of the two plies of the net with the circumferential direction of the tire.

This angle of the wires of the additonal ply 28 is generally greater than 45° (preferably about 90°) while the angles of the wires of the net are generally less than 45°, all of these angles being measured when the net, with its additional ply, is placed in the mold and with respect to the circumferential direction of the tire.

The additional ply thus forms with the plies of the net an elastic triangulation which, while making it possible to position the net in the mold, opposes deformations and/or displacement of the net during the rapid filling of the mold.

What is claimed is:

1. A process of manufacturing tires having a crown reinforcement which comprises filling a core mold with one or more liquid or pasty materials and solidifying the materials in the core mold, characterized by prior to the filling of the mold deforming by expanding or contracting and then placing in the mold at least one annular net of suitable width, continuous in the circumferential direction of the tire and elastically deformable so that in deformed state its developed length is equal to the developed length of the crown reinforcement, said net being formed of two superimposed plies of wires parallel in each ply and crossed from one ply to the other at an angle at most equal to 90° with respect to the circumferential direction of the tire, at least the outside of the wires being formed of an elastic and weldable material permitting welding of the wires of one ply to those of the other ply at the points where they intersect, the net being placed in the mold with its edges equidistant from the equatorial plane of the tire.

2. The process according to claim 1, characterized by the fact that there is used an expanded net in which the wires of each ply are formed entirely of elastic and weldable material, preferably identical to the material of the elastomeric mass of the tire; by the fact that the expanded net is placed in contact with the core of the mold, the net having in nondeformed state a developed length less than and in deformed state a developed length at least equal to the outer equatorial development of the core; and by the fact that an annular reinforcement is placed around the net.

3. The process according to claim 2, characterized by the fact that as the annular reinforcement there is used an expanded second net, the wires of the two plies of this net being in the form of cables sheathed in the elastic and weldable material, which is preferably identical to the material forming the wires of the first net, this second net having in nondeformed state a developed length less than and in deformed state a developed length at least equal to the outer equatorial development of the first net in place on the core.

4. The process according to claim 1, characterized by the fact that there is used an expanded net placed in contact with the core of the mold and having in nondeformed state a developed length less than and in deformed state a developed length at least equal to the outer equatorial development of the core, the wires of the ply of the net placed on the core being formed entirely of an elastic and weldable material and the wires of the other ply being in the form of cables sheathed in an elastic and weldable material which is preferably identical to the material constituting the wires of the first ply.

5. The process according to claim 4, characterized by the fact that there is used a single expanded net of suitable width comprising a ply of sheathed cables folded on itself prior to placement in the mold in such a manner that the folded edges are contiguous or not or overlap.

6. The process according to claim 4, characterized by the fact that over the first expanded net there is placed a second expanded net having in nondeformed state a developed length less than and in deformed state a developed length at least equal to the outer equatorial development of the first net in place on the core, the ply of wires of the second net in contact with the first net being in the form of cables sheathed in an elastic and weldable material, the other ply of the second net being formed of wires which are formed entirely of an elastic and weldable material which is preferably identical to the material covering the cables of the first ply, one of these two nets, preferably the radially outer net, having an axial width less than that of the other net and the ply of sheathed cables of the second net crossing the ply of sheathed cables of the first net to form an acute angle of a sign opposite that which the ply of sheathed cables of the first net forms with the circumferential direction of the tire.

7. The process according to claim 6, characterized by the fact that prior to placement in the mold, the edges of the wider net are folded around the edges of the axially narrower net in such a manner that the edges of the wider net are contiguous or not or overlap.

8. The process according to claims 2, 3, 4, 5, 6 or 7, characterized by the fact that a part of the wires of the radially inner ply of the net in contact with the core have a radial dimension which is larger than the other wires of the same ply.

9. The process according to claim 1, characterized by the fact that there is used a contracted net, the two plies of which are constituted of wires in the form of cables sheathed with an elastic and weldable material which is preferably identical to the material of the elastomeric mass of the tire; and by the fact that the contracted net is placed in contact either with the inner wall of the tread which has been previously placed in the mold or with the inner wall of the crown of the mold, the net having in nondeformed state a developed length greater than and in deformed state a developed length equal to the developed length of the inner wall of the tread or of the inner wall of the crown of the mold.

10. The process according to claim 1, characterized by the fact that there is used two concentric contracted nets in contact with each other, the radially outer net being placed in contact either with the radially inner face of the tread which has been previously placed in the mold or with the inner wall of the crown of the mold, the radially outer ply of the net located radially to the outside and the radially inner ply of the net located radially to the inside being formed of wires formed entirely of an elastic and weldable material, the two other plies each belonging to one of the nets in contact with each other being formed of cables sheathed with an elastic and weldable material and crossed from one ply to the other forming acute angles of opposite signs with the circumferential direction of the tire, one of the nets, preferably the net placed radially to the outside, having a smaller axial width than the other net, the two nets having in nondeformed state a developed length greater than and in deformed state a developed length equal to the developed length of the radially inner face of the tread or of the inner wall of the crown of the mold.

11. The process according to claim 1, characterized by the fact that there is used a contracted net one ply of which is formed of wires formed entirely of an elastic and weldable material and the other ply of which is formed of cables sheathed in an elastic and weldable material which is preferably identical to the material constituting the wires of the first ply; and by the fact that prior to placement in the mold the edges of the net are folded on themselves so that the edges are contiguous or not or overlap, the net having in nondeformed state a developed length greater than and in deformed state a developed length equal to the developed length of the radially inner face of the tread or of the inner wall of the crown of the mold.

12. The process according to claim 10, characterized by the fact that prior to placement in the mold the edges of the wider net are folded around the edges of the axially narrower net so that the edges of the wider net are contiguous or not or overlap.

13. The process according to claim 1 used in a mold for centrifugal molding, characterized by the fact that there is used at least one expanded net which in nondeformed state has a developed length less than and in deformed state, under the influence of centrifugal force, a developed length equal to that of the crown reinforcement.

14. The process according to claim 13, characterized by the fact that the two plies of the net are formed of cables sheathed in an elastic and weldable material.

15. The process according to claim 14, characterized by the fact that one of the plies of the net consists of cables sheathed in an elastic and weldable material; and by the fact that prior to the placement of the net in the mold, the edges of the net are folded on themselves in such a manner that the edges are contiguous or not or overlap.

16. The process according to claim 14, characterized by the fact that there is used two expanded nets of different axial width each having a ply of cables sheathed in an elastic and weldable material; and by the fact that the wider net is arranged radially inward of the other net.

17. The process according to claim 16, characterized by the fact that prior to placement in the mold the edges of the wider net are folded around the edges of the axially narrower net so that the edges of the wider net are contiguous or not or overlap.

18. The process according to claim 1, characterized by the fact that there is used an expanded or contracted net having at least one additional ply formed of parallel wires formed entirely of an elastic material which is weldable to one of the two plies of the net, said wires forming with the circumferential direction of the tire a larger angle in absolute value than each of the angles formed by the wires of the two plies of the net with the circumferential direction of the tire.

19. The process according to claim 18, characterized by the fact that there is used an expanded or contracted net, the wires of which form angles of less than 45° with the circumferential direction of the tire while the wires of the additional ply form an angle of greater than 45° with the circumferential direction of the tire.

20. The process according to claim 18 or claim 19, characterized by the fact that there is used an expanded or contracted net, the wires of the additional ply of which form an angle of about 90° with the circumferential direction of the tire.

21. A tire having a crown reinforcement produced by the process of claim 1 or 18.

* * * * *

UNITED STATES PATENT AND TRADEMARK OFFICE
CERTIFICATE OF CORRECTION

PATENT NO. : 4,301,850
DATED : November 24, 1981
INVENTOR(S) : Schneider et al.

It is certified that error appears in the above—identified patent and that said Letters Patent is hereby corrected as shown below:

Column 10, lines 26 and 33, delete "claim 14" and insert -- claim 13 --.

Signed and Sealed this

Sixteenth Day of November 1982

[SEAL]

Attest:

GERALD J. MOSSINGHOFF

Attesting Officer          Commissioner of Patents and Trademarks